(12) United States Patent
Fujii et al.

(10) Patent No.: US 7,512,355 B2
(45) Date of Patent: Mar. 31, 2009

(54) OZONE EXHAUST SYSTEM FOR IMAGE FORMING APPARATUS

(75) Inventors: Tomohiko Fujii, Yamatokooriyama (JP); Susumu Murakami, Souraku-gun (JP); Takashi Hori, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 11/257,038

(22) Filed: Oct. 25, 2005

(65) Prior Publication Data

US 2006/0088454 A1   Apr. 27, 2006

(30) Foreign Application Priority Data

Oct. 25, 2004   (JP) .............................. 2004-309692

(51) Int. Cl.
*G03G 15/01* (2006.01)
(52) U.S. Cl. ............... 399/92; 422/186.07; 422/186.15; 422/186.12; 399/93; 399/299
(58) Field of Classification Search ............ 422/186.15, 422/186.07, 186.12; 399/299
See application file for complete search history.

(56) References Cited

U.S. PATENT DOCUMENTS

2004/0234301 A1 * 11/2004 Sato et al. .................... 399/299

FOREIGN PATENT DOCUMENTS

| JP | 4-120556 A | 4/1992 |
| JP | 8-095474 A | 4/1996 |
| JP | 2004-287216 A | 10/2004 |
| JP | 2004-354663 A | 12/2004 |

* cited by examiner

*Primary Examiner*—Melvin C Mayes
*Assistant Examiner*—Melissa Stalder
(74) *Attorney, Agent, or Firm*—Nixon & Vanderhye P.C.

(57) ABSTRACT

An ozone exhaust system in an image forming apparatus having a multiple number of process printing units, includes: exhaust ducts for exhausting ozone arising in the process printing units. In the ozone exhaust system, the exhaust ducts are mainly constituted of process printing unit's side exhaust ducts provided respectively along multiple charger cases and a main exhaust duct to which the process printing unit's side exhaust ducts are connected, and the process printing unit's side exhaust ducts are constructed so that the air current that flows into the charger cases and the air current that flows from the process printing unit's side exhaust ducts into the main exhaust duct are directed in the same direction.

8 Claims, 11 Drawing Sheets

(a)

(b)

(c)

(a)

(b)

(c)

(a)

(b)

(c)

(d)

(a)

(b)

(c)

(d)

OZONE EXHAUST SYSTEM FOR IMAGE FORMING APPARATUS

This Nonprovisional application claims priority under 35 U.S.C. § 119(a) on Patent Application No. 2004-309692 filed in Japan on 25 Oct. 2004, the entire contents of which are hereby incorporated by reference.

BACKGROUND OF THE INVENTION (1) Field of the Invention

The present invention relates to an ozone exhaust system for image forming apparatus, and in particular relates to an ozone exhaust system for exhausting ozone arising from a process printing unit of an image forming apparatus.

(2) Description of the Prior Art

In conventional image forming apparatus, voltage application using high voltage sources has been practiced in order to provide electric charge on the photoreceptor in the process printing unit. It is well known that during this process ozone gas will arise from electric field generators (charger wires, needles of needle electrodes, etc.).

Ozone not only has a harmful effect on human body and environment, but also causes damage to photoconductive layers of the photoreceptors used in image forming apparatus. For this reason, there occurs the problem that as a result of aging or depending on the usage history of the image forming apparatus, the photoreceptor become unable to be charged with a correct voltage, inducing local fluctuation in the surface potential thereof, thus causing printing defects such as "printing blur" and "poor sensitivity".

In order to solve these problems, when air is exhausted from the image forming apparatus, an ozone filter is disposed at the outlet port so that exhaust air meeting the necessary environmental standard will be discharged.

Also, various methods have been proposed for countermeasures against ozone generation: one in which shielding members such as ducts etc. are arranged against the ozone generating source so as to improve ventilation efficiency and remove generated ozone as soon as possible; and one in which members such as photoreceptors etc., which are likely to spoil by ozone are arranged away from the ozone generating source (see Japanese Patent Application Laid-open Hei 04 No. 120556, Japanese Patent Application Laid-open Hei 08 No. 95474).

On the other hand, in the field of recent color image forming apparatus, many kinds of apparatus have been developed which each include multiple process printing units (process printing units for black, yellow, magenta and cyan) unlike a conventional apparatus that include only one process printing unit.

For such a color image forming apparatus, since provision of exhaust ducts and exhaust fans for individual process printing units leads to enlargement and cost-increase of the apparatus, it is a common practice to connect a multiple number of ducts to a single exhaust fan so as to efficiently draw the generated ozone out of the machine to thereby lessen pollution inside the apparatus.

As a typical conventional ozone removal technique, a multiple number of apertures (holes) are formed in the suctioning part of the ducts provided for ozone generating areas so that generated ozone is suctioned into the ducts while fresh air is lead to the ozone generating areas.

The hole size of the apertures are made greater as they become distant from the exhaust fan so as to make the exhaust fan's efficiency (suctioning efficiency) constant.

However, in the conventional technique, there has been a problem that exhaust efficiency unevenness occurs due to the positional relationship between the exhaust fan and process printing units if ozone is tried to be removed at the same time from multiple process printing units by a single exhaust fan.

Thus, a simple arrangement of ducts just considering exhaust in the ozone exhaust system of the conventional image forming apparatus, cannot solve the uneven ozone concentration distribution problem with which parts and components exposed to high-concentration ozone are adversely affected.

SUMMARY OF THE INVENTION

In view of the conventional problems described above, an ozone exhaust system has been invented for use in an image forming apparatus wherein the concentration of ozone remaining in process printing units is reduced and made uniform.

An ozone exhaust system has been developed for use in an image forming apparatus including a plurality of process printing units, each creating a separated color image corresponding to a color of color-separated image information, includes: shielding members, each enclosing an electric field generating element of the process printing unit, from one side end to the other side end; and exhaust passages, connected to shielding members and exhausting ozone generated in the shielding members, and is characterized in that the exhaust passages include a plurality of process printing unit's side exhaust passages provided for the respective shielding members and a main exhaust passage to which the process printing unit's side exhaust passages are connected, and the process printing unit's side exhaust passages are constructed so that the air current that flows into the shielding members and the air current that flows from the process printing unit's side exhaust passages into the main exhaust passage are directed in the same direction.

An ozone exhaust system has been developed for use in an image forming apparatus having the above first feature is further characterized in that the main exhaust passage is laid out on one side of the process printing units that are arranged parallel to each other, along the direction of arrangement of the process printing units; the process printing unit's side exhaust passages are extended approximately perpendicularly to the main exhaust passage and arranged parallel to each other along the direction of the air current inside the main exhaust passage; and an exhaust fan is provided for the main exhaust passage, at a position on the interior side relative to the process printing unit's side exhaust passages located at both ends.

An ozone exhaust system has been developed for use in an image forming apparatus having the above first or second feature, is further characterized in that the joint of the process printing unit's side exhaust passage with the main exhaust passage is arranged, slanting to the downstream side with respect to the direction of the air current that flows into the shielding member, from the position perpendicular to the main exhaust passage.

An ozone exhaust system has been developed for use in an image forming apparatus having the above second feature is further characterized in that the process printing unit's side exhaust passage, being constructed so that the air current that flows into the shielding member and the air current that flows from the process printing unit's side exhaust passage into the main exhaust passage are directed in the same direction, is joined to the main exhaust passage, at an angle equal to or smaller than 90 degrees with respect to the direction of the air current flowing through the main exhaust passage.

An ozone exhaust system has been developed for use in an image forming apparatus having the above second feature is characterized in that the process printing unit's side exhaust passage, being constructed so that the air current that flows into the shielding member and the air current that flows from the process printing unit's side exhaust passage into the main exhaust passage are directed opposite, is joined to the main exhaust passage, at an angle equal to or smaller than 90 degrees with respect to the opposite direction of the air current flowing through the main exhaust passage.

In the ozone exhaust systems of an image forming apparatus described herein, the exhaust passages for exhausting ozone may include a plurality of process printing unit's side exhaust passages provided for the respective shielding members and a main exhaust passage to which the process printing unit's side exhaust passages are connected, and the process printing unit's side exhaust passages are constructed so that the air current that flows into the shielding members and the air current that flows from the process printing unit's side exhaust passages into the main exhaust passage are directed in the same direction. This arrangement makes it possible to establish smooth flow of air from the process printing unit's side exhaust passages into the main exhaust passage. As a result, it is possible to reduce the residual ozone concentrations inside the process printing units and equalize the ozone concentrations therein.

The main exhaust passage of the ozone exhaust systems disclosed herein may be laid out on one side of the process printing units that are arranged parallel to each other, along the direction of arrangement of the process printing units; the process printing unit's side exhaust passages are extended approximately perpendicularly to the main exhaust passage and arranged parallel to each other along the direction of the air current inside the main exhaust passage; and an exhaust fan is provided for the main exhaust passage, at a position on the interior side relative to the process printing unit's side exhaust passages located at both ends. This arrangement makes it possible to provide a compact configuration without enlargement of the outside dimensions of the apparatus.

In the ozone exhaust systems disclosed herein, the joint of the process printing unit's side exhaust passage with the main exhaust passage may be arranged, slanting to the downstream side with respect to the direction of the air current that flows into the shielding member, from the position perpendicular to the main exhaust passage. This arrangement makes it possible to establish smooth flow of air from the process printing unit's side exhaust duct toward the main exhaust duct.

In the ozone exhaust systems disclosed herein, the process printing unit's side exhaust passage, being constructed so that the air current that flows into the shielding member and the air current that flows from the process printing unit's side exhaust passage into the main exhaust passage are directed in the same direction, may be joined to the main exhaust passage, at an angle equal to or smaller than 90 degrees with respect to the direction of the air current flowing through the main exhaust passage. This arrangement makes it possible to establish smooth flow of air from the process printing unit's side exhaust duct toward the main exhaust duct.

In the ozone exhaust systems disclosed herein, the process printing unit's side exhaust passage, being constructed so that the air current that flows into the shielding member and the air current that flows from the process printing unit's side exhaust passage into the main exhaust passage are directed opposite, is joined to the main exhaust passage, at an angle equal to or smaller than 90 degrees with respect to the opposite direction of the air current flowing through the main exhaust passage. This arrangement makes it possible to establish smooth flow of air from the process printing unit's side exhaust duct toward the main exhaust duct.

DESCRIPTION OF THE PREFERRED EMBODIMENTS

The best mode for carrying out the present invention will hereinafter be described with reference to the drawings.

Figure 1:
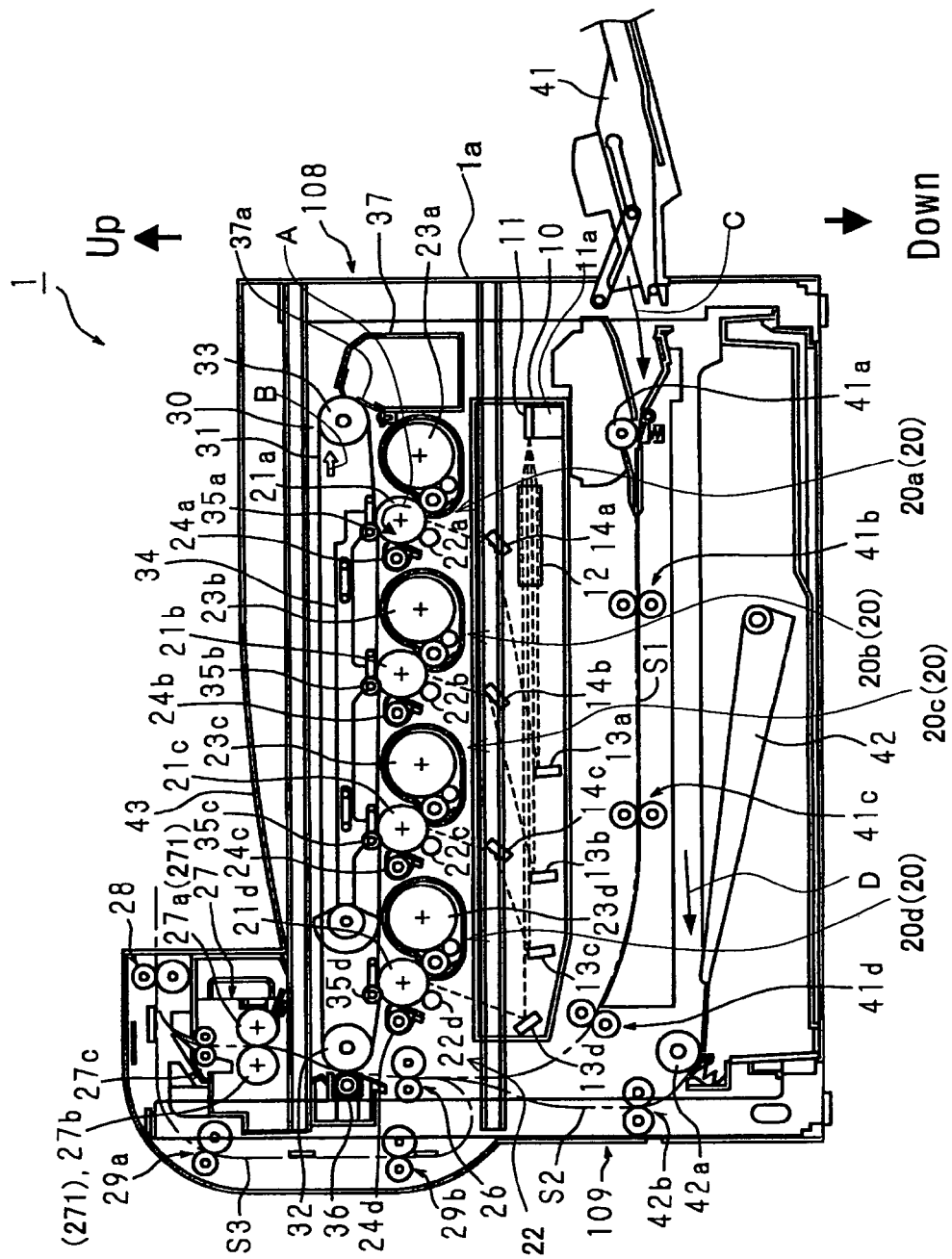
FIG. 1 is an illustrative diagram showing the overall configuration of an image forming apparatus according to one embodiment mode of the present invention.
Figure 2:
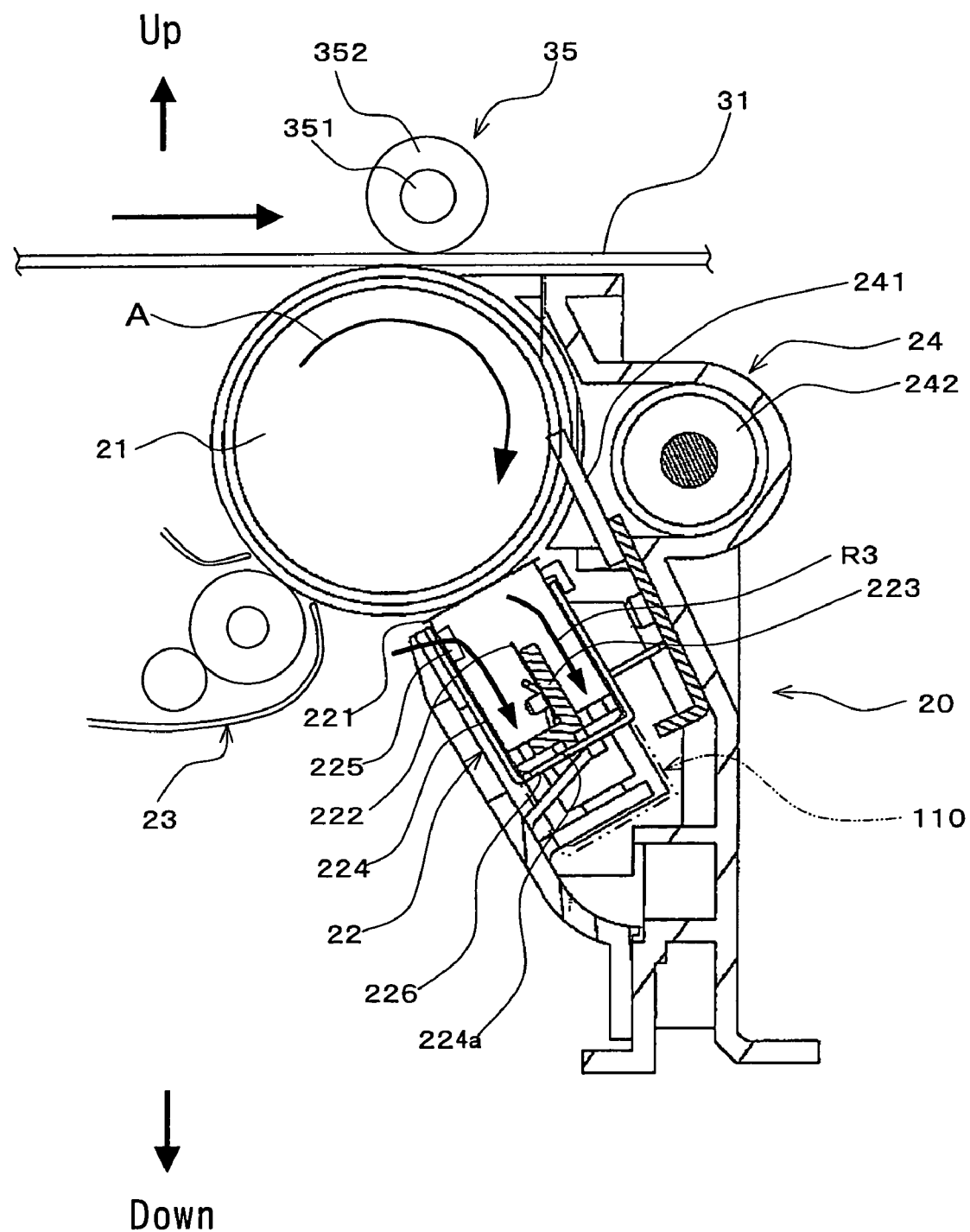
FIG. 2 is an illustrative diagram showing the configuration of a process printing unit as a constituent of the image forming apparatus.
Figure 3:
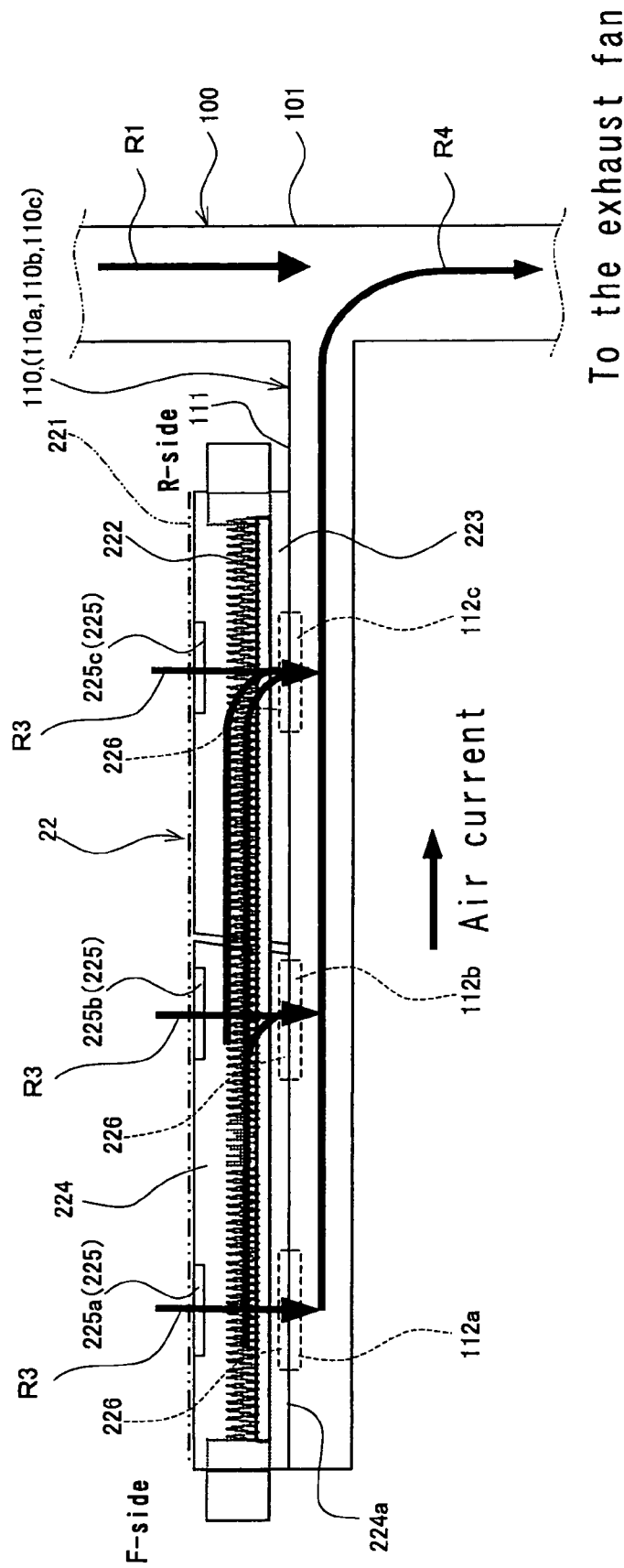
FIG. 3 is an illustrative diagram showing the arrangement of chargers as the constituents of the process printing units and exhaust ducts connected to the chargers.

FIGS. 1 to 3 show one embodiment mode of the present invention, and FIG. 1 is an illustrative diagram (sectional view from the rear) showing the overall configuration of an image forming apparatus according to the embodiment mode of the present invention; FIG. 2 is an illustrative diagram showing the configuration of a process printing unit as a constituent of the image forming apparatus; and FIG. 3 is an illustrative diagram showing the arrangement of chargers as the constituents of the process printing units and exhaust ducts connected to the chargers.

As shown in FIGS. 1 and 2, an image forming apparatus 1 of the present embodiment mode includes: a plurality of process printing units 20 (20a, 20b, 20c and 20d) each creating a separated color image corresponding to a color of color-separated image information; and an ozone exhaust system having exhaust ducts for exhausting ozone arising in process printing units 20.

Here, concerning the positional relationship between the image forming apparatus 1 and the operator in the present embodiment mode, the operator is supposed to stand at the far side of the image forming apparatus 1 shown in FIG. 1. In other words, the control side is located on the unillustrated side of image forming apparatus 1, and the left and right sides as one faces FIG. 1 are the reverse of those when the operator faces the control side.

In the following description, the front side (F-side) refers to the operator side and the rear side (R-side) refers to the backside of image forming apparatus 1, or the side shown by FIG. 1.

To begin with, the overall configuration of image forming apparatus 1 will be described.

As shown in FIG. 1, image forming apparatus 1 according to the present embodiment mode is a so-called digital color printer which is adapted to output a color image by separating color image information into images of individual colors, is mainly composed of an image forming portion 108 and a paper feed portion 109, and forms a multi-color image or monochrome image on a recording sheet in accordance with a print job sent from an information processor (not illustrated) such as a personal computer etc., externally connected.

Image forming portion 108 forms multi-color images based on electrophotography with yellow (Y), magenta (M), cyan (C) and black (K) colors. This image forming portion is mainly composed of an exposure unit 10, process printing units 20, a fixing unit 27, a transfer belt unit 30, and a transfer belt cleaning unit 37.

Describing the overall arrangement of image forming portion 108, fixing unit 27 is disposed on the top at one end side of a housing 1a of image forming apparatus 1, transfer belt unit 30 is extended under the fixing unit 27 from the one end side to the other end side of housing 1a, process printing units 20 are disposed under the transfer belt unit 30, and exposure unit 10 is disposed under the process printing units 20. Further, transfer belt cleaning unit 37 is arranged on the other side end of transfer belt unit 30. Also, a paper output tray 43 is arranged contiguous to fixing unit 27, over image forming portion 108.

Also, paper feed portion 109 is arranged under the image forming portion 108.

In the present embodiment mode, as process printing units 20, four process printing units 20a, 20b, 20c and 20d, corresponding to individual colors, i.e., yellow (Y), magenta (M), cyan (C) and black (K), are provided.

These process printing units 20a, 20b, 20c and 20d are arranged in parallel to each other, in the approximately horizontal direction (in the left-to-right direction in the drawing) in housing 1a, and include respective photoreceptor drums 21a, 21b, 21c and 21d as the image support for each individual associated color, respective charging devices 22a, 22b, 22c and 22d for charging the photoreceptor drums 21a, 21b, 21c and 21d, respective developing devices 23a, 23b, 23c and 23d and respective cleaner units 24a, 24b, 24c and 24d and other components.

Here, the symbol a, b, c, and d are added to the constituents so as to show correspondence to yellow (Y), magenta (M) and cyan (C), and black (K) colors, respectively. In the description hereinbelow, however, the constituents provided for each color are generally referred to as photoreceptor drum 21, charging device 22, developing device 23, and cleaner unit 24, except in the case where a constituent corresponding to a specific color needs to be specified.

Photoreceptor drum 21 is arranged so that part of its outer peripheral surface comes into contact with the surface of transfer belt unit 30 while charging device 22 as an electric field generator, developing device 23 and cleaner unit 24 are arranged along, and close to, the outer peripheral surface of the drum.

As shown in FIGS. 2 and 3, charging device 22 is mainly composed of a grid electrode 221, needle-like electrode 222 and a holder 223 and a charger case 224 as a shielding member. Though in the present embodiment mode a discharging type charger is used as charging device 22, a roller type charger, brush type charger etc., may be used in place.

Charging device 22 is arranged, at a position on the approximately opposite side across photoreceptor drum 21, from transfer belt unit 30, so that its grid electrode 221 comes in contact with the outer peripheral surface of photoreceptor drum 21. That is, grid electrode 221 is arranged under photoreceptor drum 21.

The grid electrode 221 has a lattice-like or mesh-like configuration and is intended to uniformly charge the outer peripheral surface of photoreceptor drum 21 at a predetermined potential.

Needle-like electrode 222 has a fine saw-toothed configuration and is arranged extending along the length of the photoreceptor drum 21 and opposing photoreceptor drum 21 with grid electrode 221 in-between.

Holder 223 is formed along the length of photoreceptor drum 21 so as to hold needle-like electrode 222 in charger case 224.

Charger case 224 is a shield member for shielding needle-like electrode 222 from without and encloses needle-like electrode 222 and holder 223 while having a box-like configuration with an opening on the grid electrode 221 side, where grid electrode 221 is attached.

In this way, charging device 22 is arranged under photoreceptor drum 21, the opening side of charger case 224 is directed upward and covered with grid electrode 221, and needle-like electrode 222 is disposed under the grid electrode 221.

As shown in FIG. 3, charger case 224 is formed with three suctioning ports 225, namely, openings 225a, 225b and 225c located on the F-side, at the approximate midpoint between the F-side and the R-side, and on the R-side.

Openings 225a, 225b and 225c are formed approximately equi-distantly from each other along the length of charger case 224. The opening area of each opening 225a, 225b or 225c is sized to be about 5% of the sectional area of the process printing unit.

Also, a process printing unit side's exhaust duct 110 is arranged along the bottom side, designated at 224a, of charger case 224, located under needle-like electrode 222.

Three communication holes 226 connected to process printing unit side's exhaust duct 110 are formed on bottom side 224a, at positions on the F-side, at the approximate midpoint between the F-side and the R-side, and on the R-side, correspondingly to the three openings 225a, 225b and 225c. The openings of these communication holes 226 are rectangular and have approximately the same opening area.

As shown in FIG. 2, each developing device 23 holds a toner of black (K), yellow (Y), magenta (M) or cyan (C) color and is arranged on the downstream side of charging device 22 with respect to the rotational direction of the photoreceptor drum (in the direction of arrow A in the drawing), so that the toner of each color is supplied to the electrostatic latent image formed on the peripheral surface of the photoreceptor drum 21 to produce a visual image.

Cleaner unit 24 is arranged on the upstream side of charging device 22 with respect to the rotational direction of the photoreceptor drum. Further, as shown in FIG. 2, cleaner unit 24 has a cleaning blade 241 and is configured so that the cleaning blade 241 is positioned in abutment with the outer peripheral surface of photoreceptor drum 21 so as to scrape and collect leftover toner off the photoreceptor drum 21. A reference numeral 242 in the drawing designates a conveying screw for conveying the collected toner.

As shown in FIG. 1, exposure unit 10 is to create an electrostatic latent image by radiating a laser beam onto the surface of photoreceptor drum 21 of each color in accordance with the image data for printing, and is mainly composed of a laser scanning unit (LSU) 11 having a laser illuminator 11a, a polygon mirror 12 and reflection mirrors 13a, 13b, 13c, 13d, 14a, 14b and 14c for reflecting the laser beam for every colors.

The laser beam emitted from laser illuminator 11a is separated into components for different colors, by polygon mirror 12, so that the separated components of light are reflected by respective reflection mirrors 13a to 13d and 14a to 14c to illuminate the corresponding photoreceptor drums 21 of every color.

Here, concerning laser scanning unit 11, a writing head made up of an array of light emitting devices such as EL (electro luminescence), LED (light emitting diode) and others, may also be used instead of laser illuminator 11a.

Transfer belt unit 30 is mainly composed of transfer belt 31, a transfer belt drive roller 32, a transfer belt driven roller 33, a transfer belt tension mechanism 34, intermediate transfer rollers 35a, 35b, 35c and 35d.

In the following description, any of the intermediate transfer rollers 35a, 35b, 35c and 35d will be referred to as intermediate transfer rollers 35 when general mention is made.

Transfer belt 31 is formed of an endless film of about 75 μm to 120 μm thick. Transfer belt 31 is made from polyimide, polycarbonate or the like.

Also, transfer belt 31 is tensioned by transfer belt drive roller 32, transfer belt driven roller 33, transfer belt tension mechanism 34 and intermediate transfer rollers 35 so that its surface comes into contact with the outer peripheral surfaces of photoreceptor drums 21, and is adapted to move in the auxiliary scan direction (in the direction of arrow B in the drawing) by a driving force of the transfer belt drive roller 32.

Transfer belt drive roller 32 is disposed at one end side of housing 1a, and is wound with transfer belt 31 so as to drive the transfer belt 31 by applying a driving force whilst nipping and pressing the transfer belt 31 and a recording sheet together between itself and transfer roller 36 to convey the recording sheet.

Transfer roller 36 is arranged opposing transfer belt drive roller 32 at approximately the same level and in parallel thereto and pressing against the transfer belt 31 wound on the transfer belt driver roller 32, forming a predetermined nip therewith while being applied with a high voltage of a polarity (+) opposite to the polarity (−) of the static charge on the toner, for transferring the multi-color toner image formed on the transfer belt 31 to the recording sheet.

In order to produce a constant nip between transfer belt 31 and transfer roller 36, either transfer belt drive roller 32 or transfer roller 36 may be formed of a hard material such as metal or the like while the other roller may be formed of a soft material such as elastic rubber, foamed resin, etc.

A registration roller 26 is provided under transfer belt drive roller 32 and transfer roller 36. This registration roller 26 is configured to set the front end of the recording sheet fed from paper feed portion 109 in register with the leading end of the toner image on transfer belt 31 and deliver the sheet toward the transfer roller 36 side.

Transfer belt driven roller 33 is disposed on the other end side of housing 1a, so as to suspend and tension the transfer belt 31 approximately horizontally from the one end side to the other end side of housing 1a, in cooperation with transfer belt drive roller 32.

Intermediate transfer rollers 35 are arranged in the interior space of transfer belt 31 wound between transfer belt drive roller 32 and transfer belt driven roller 33 so as to abut the inner surface of transfer belt 31 and press its outer peripheral surface against the outer peripheral surfaces of the photoreceptor drums 21.

Further, as shown in FIG. 2, intermediate transfer roller 35 is formed of a metal (e.g., stainless steel) shaft having a diameter of 8 to 10 mm and a conductive elastic material 352 such as EPDM, foamed urethane etc., coated on the outer peripheral surface of the metal shaft.

Each of the thus formed intermediate transfer rollers 35 is applied with a high-voltage transfer bias for transferring the toner image formed on photoreceptor drum 21 to transfer belt 31, i.e., a high voltage of a polarity (+) opposite to the polarity (−) of the electrostatic charge on the toner, so as to apply a uniform high voltage from elastic material 352 to transfer belt 31.

As shown in FIG. 1, transfer belt cleaning unit 37 has a cleaning blade 37*a* arranged near transfer belt driven roller 33 so that the cleaning blade 37*a* can abut transfer belt 31 and scrape and collect leftover toner from transfer belt 31.

Fixing unit 27 includes: as shown in FIG. 1, paired fixing rollers 271 consisting of a heat roller 27*a* and a pressing roller 27*b*; and a conveying roller 27*c* above the fixing rollers 271. Recording paper is input from below fixing rollers 271 and output to above conveying roller 27*c*.

A paper discharge roller 28 is arranged above fixing unit 27, so that the recording sheet conveyed from conveying roller 27*c* is discharged by the paper discharge roller 28 to a paper output tray 43.

Referring to the fixing of a toner image by fixing unit 27, a heating device (not shown) such as a heater lamp or the like, provided inside or close to heat roller 27*a* is controlled based on the detected value from a temperature detector (not shown) so as to keep the heat roller 27*a* at a predetermined temperature (fixing temperature) while the recording sheet with a toner image transferred thereon is heated and pressed between heat roller 27*a* and pressing roller 27*b* as it is being conveyed and rolled, so that the toner image is thermally fused onto the recording sheet.

A duplex printing paper path S3 for double-sided printing is constructed adjacent to fixing unit 27, from the rear of fixing unit 27 downward to the vicinity of paper feed portion 109. Conveying rollers 29*a* and 29*b* are arranged at the top, and bottom and along the duplex printing paper path S3, so that the recording sheet is delivered again toward transfer roller 36 with its face inverted.

Specifically, conveying roller 29*a* is disposed at the rear of fixing unit 27 and conveying roller 29*b* is located below conveying roller 29*a* with respect to the top and bottom direction and at approximately the same level as registration roller 26.

Next, the configuration of paper feed portion 109 will be described.

Paper feed portion 109 includes a manual feed tray 41 and paper feed cassette 42 for holding recording sheets to be used for image forming, and is adapted to deliver recording sheets, one by one, from manual feed tray 41 or paper feed cassette 42 to image forming portion 108.

As shown in FIG. 1, manual feed tray 41 is arranged at one side end (on the right side in the drawing) of housing 1*a* of image forming apparatus 1 so that it can be unfolded outside when used and folded up to the one end side when unused. This tray delivers paper, one by one, into the housing 1*a* of image forming apparatus 1 when the user places a few recording sheets (necessary number of sheets) of a desired type.

Arranged on the downstream side with respect to the paper feed direction (the direction of arrow C in the drawing) of recording paper by manual feed tray 41, inside housing 1*a* of image forming apparatus 1, is a pickup roller 41*a* below exposure unit 10. Conveying rollers 41*b*, 41*c* and 41*d* are also disposed at approximately the same level along the path downstream with respect to the paper feed direction.

Pickup roller 41*a* touches one edge part of the surface of the recording sheet that is fed from manual feed tray 41 and reliably conveys the paper, sheet by sheet, by the function of roller's frictional resistance.

Conveying roller 41*d* located on the most downstream side is positioned above conveying rollers 41*b* and 41*c*, so as to convey recording paper upward.

The aforementioned pickup roller 41*a* and conveying rollers 41*b*, 41*c* and 41*d* constitute a recording paper conveying path S1.

On the other hand, paper feed cassette 42 is arranged under the image forming portion 108 and exposure unit 10 in housing 1*a*, so as to accommodate a large amount of recording sheets of a size specified by the specification of the apparatus or of a size that is determined beforehand by the user.

Arranged above one end side (the left-hand side in the drawing) of paper feed cassette 42 is a pickup roller 42*a*. A conveying roller 42*b* is also provided obliquely above and on the downstream side of the pickup roller 42*a* with respect to the recording paper feed direction (the direction of arrow D in the drawing).

Pickup roller 42*a* touches one edge of the surface of the topmost recording sheet of a stack of recording sheets on paper feed cassette 42 and reliably picks up and feeds the paper, sheet by sheet, by the function of roller's frictional resistance.

Conveying roller 42*b* conveys the recording sheet delivered from pickup roller 42*a* upward along a recording sheet feed path S2 formed on one end side inside housing 1*a* to image forming portion 108.

Referring next to the drawings, the configuration of an ozone exhaust system in image forming apparatus 1 of the present embodiment mode will be described.

Figure 4:
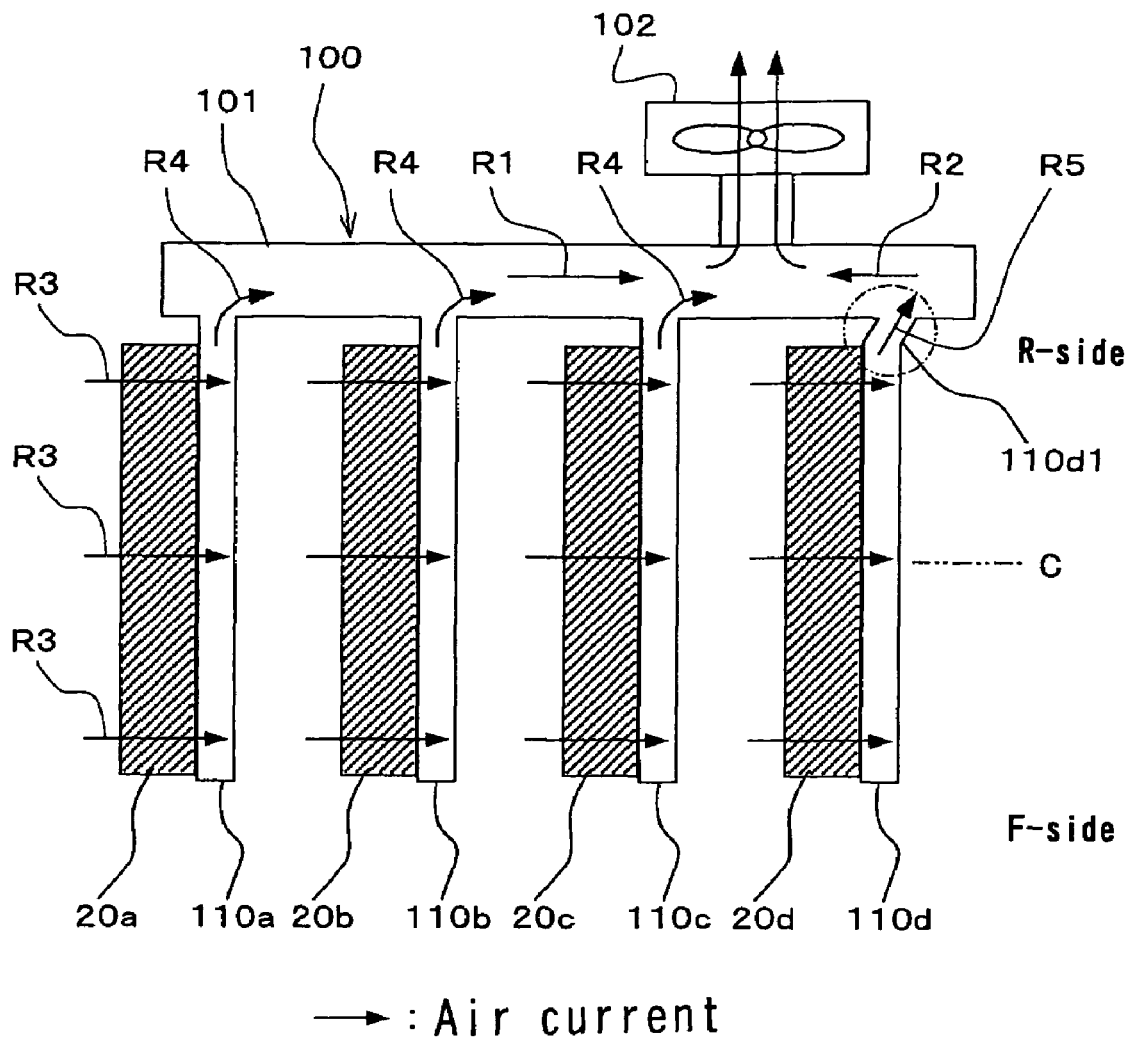
FIG. 4 is an illustrative diagram showing the overall configuration of an ozone exhaust system in the image forming apparatus.
Figure 5:
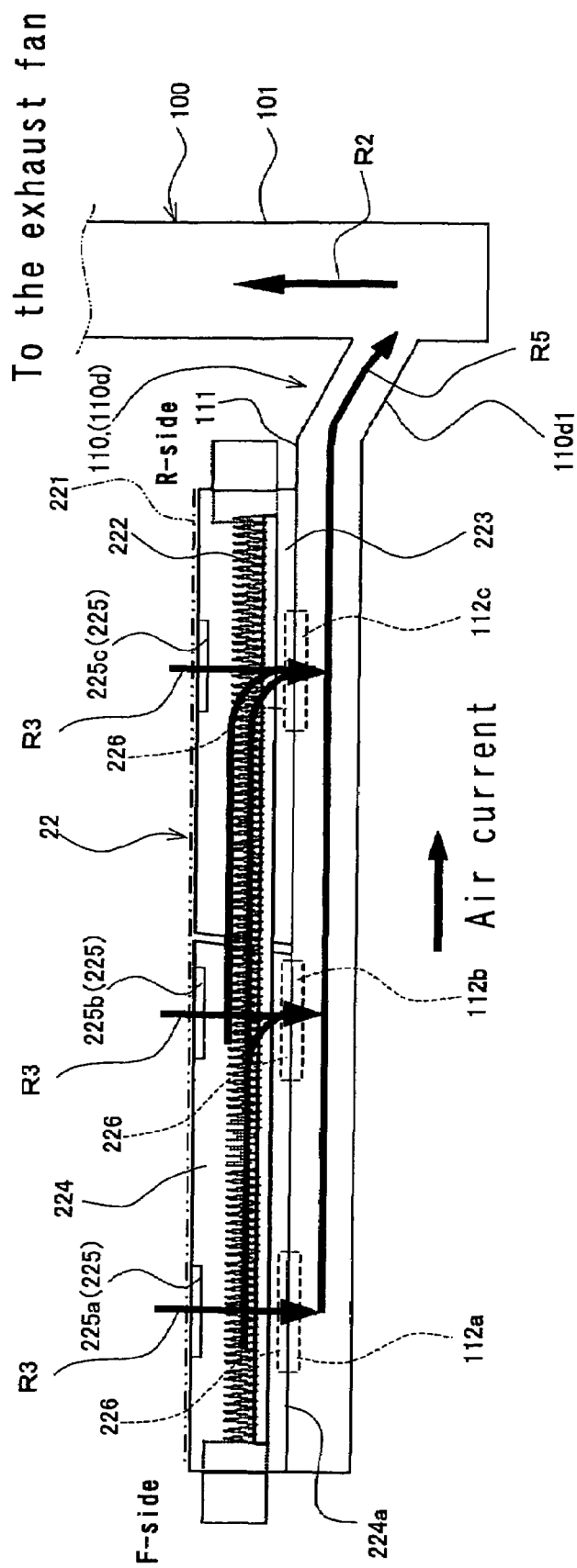
FIG. 5 is an illustrative diagram showing the configuration of a printing unit's side exhaust duct for the fourth-color process printing unit in the ozone exhaust system.

FIG. 4 is an illustrative diagram showing the overall configuration of an ozone exhaust system in the image forming apparatus according to the present embodiment mode. FIG. 5 is an illustrative diagram showing the configuration of the fourth-color process printing unit's side exhaust duct in the ozone exhaust system.

As shown in FIG. 4, an ozone exhaust system 100 in image forming apparatus 1 according to the present embodiment mode is constructed such that all the process printing unit's side exhaust ducts 110*a*, 110*b*, 110*c* and 110*d* provided for process printing units 20*a*, 20*b*, 20*c* and 20*d* are connected to a single main exhaust duct 101 so as to ventilate all the units simultaneously by a single exhaust fan 102.

Main exhaust duct 101 constitutes the main exhaust path of ozone exhaust system 100 and is disposed on one side of process printing units 20*a* to 20*d* that are arranged parallel to each other in image forming apparatus 1, and is extended along the direction of the arrangement of process printing units 20*a* to 20*d*.

Exhaust fan 102 is disposed on main exhaust duct 101, between process printing unit's side exhaust ducts 110*c* and 110*d* provided for the third and fourth-color process printing units 20*c* and 20*d* of the parallel arrangement of, four process printing units 20.

As a result, two air currents are generated inside main exhaust duct 101 by exhaust fan 102: an air current R1 from the first through the third of process printing units 20 toward exhaust fan 102; and the other air current R2 from the fourth-color process printing unit 20 toward exhaust fan 102, air current R1 and air current R2 being directed in the opposite directions.

Since the configurations of process printing unit's side exhaust ducts 110*a* to 110*d* are almost the same except in the shape of coupling with main exhaust duct 101, description will be made based on the configuration of process printing unit's side exhaust ducts 110*a* to 110*c* with reference to FIG. 3.

As shown in FIG. 3, each of process printing unit's side exhaust ducts 110*a* to 110*d* has a rectangular section, and is extended in the longitudinal direction of charging device 22 along charger case 224 with its F-side closed and R-side connected to main exhaust duct 101. That is, air inside process printing unit's side exhaust ducts 110a to 110d is exhausted from the F-side to the R-side.

Formed in the wall, designated at 111, which opposes charger case 224, of each of process printing unit's side exhaust ducts 110a to 110d, are communication holes 112a, 112b and 112c, opposing the three communication holes 226 formed on the charger case 224 side, and communicating with the interior of the charger case 224. The openings of communication holes 112a, 112b and 112c are formed to be rectangular and approximately equal in area of opening to those of communication holes 226.

As shown in FIG. 4, process printing unit's side exhaust ducts 110a, 110b and 110c are joined approximately perpendicularly to main exhaust duct 110.

On the other hand, process printing unit's side exhaust duct 110d, is joined to main exhaust duct 101 in such a manner that the joint part, designated at 110d1, is slanted in a direction against the flow of air current R2 inside the main exhaust duct 101, as shown in FIGS. 4 and 5.

Concerning the flows of air into process printing unit's side exhaust ducts 110a to 110d, air flowing through grid electrode 221 and suctioning ports 225 provided for each charger case 224 and passing through charger case 224, enters the duct, in the same direction as that in which the transfer belt moves, as shown in FIGS. 2 and 4. That is, air current R3 flows in the same direction as that of the air current R1 which goes from the first color process printing unit through third-color process printing unit to exhaust fan 102 inside main exhaust duct 101.

Now, how air flows upon ozone exhaustion by ozone exhaust system 100 according to the present embodiment mode will be described with reference to the drawings.

First, description will be made of the flow of air from process printing unit's side exhaust ducts 110a to 110c into main exhaust duct 101.

As to the air flowing into process printing unit's side exhaust ducts 110a to 110c by way of process printing units 20a to 20c, air flows into process printing unit's side exhaust ducts 110a to 110c as air current R3 and then are deflected in the F-side to R-side direction in respective process printing unit's side exhaust ducts 110a to 110c, as shown in FIG. 4.

Further, the air current, designated at R4, when flowing from process printing unit's side exhaust ducts 110a to 110c into main exhaust duct 101, are deflected again at, and around the joints with main exhaust duct 101 so that air flows in the direction of air current R1 inside main exhaust duct 101.

In observing the above air current continuously, the air current R3 flowing into process printing unit's side exhaust ducts 110a to 110c and the air current R4 flowing from process printing unit's side exhaust ducts 110a to 110c into main exhaust duct 101 flow in almost the same direction.

Next, description will be made of the flow of air from process printing unit's side exhaust duct 110d into main exhaust duct 101.

As to the air flowing into process printing unit's side exhaust duct 110d by way of process printing unit 20d, air flows into process printing unit's side exhaust duct 110d as air current R3 and then are deflected in the F-side to R-side direction in process printing unit's side exhaust duct 110d, as shown in FIGS. 4 and 5.

Further, the air current, designated at R5, when flowing from process printing unit's side exhaust duct 110d into main exhaust duct 101, is guided by the joint, designated at 110d1, with main exhaust duct 101, briefly turned in the direction opposing the air current R2 in main exhaust duct 101 or in the direction of air current R1, and then flows into main exhaust duct 101.

In observing the above air current continuously, similarly to the aforementioned case referring to the process printing unit's side exhaust ducts 110a to 110c, the air current R3 flowing into process printing unit's side exhaust duct 110d and the air current R5 flowing from process printing unit's side exhaust duct 110d into main exhaust duct 101 flow in almost the same direction.

Thus, it is possible to secure smooth flow of air through the ducts by having the air current R3 flowing into process printing unit's side exhaust ducts 110a to 110d and the air current R4 and R5 flowing from process printing unit's side exhaust ducts 110a to 110d into main exhaust duct 101 directed toward approximately the same direction.

Next, image output by image forming apparatus 1 in the present embodiment mode will be described.

Image forming apparatus 1 is constructed so as to transfer the toner images formed on photoreceptor drums 21 to a recording sheet fed from paper feed portion 109 by a so-called intermediate transfer process, or via transfer belt unit 30.

First, charging device 22 uniformly electrifies the outer peripheral surface of photoreceptor drum 21 at a predetermined voltage.

The electrified photoreceptor drums 21 are irradiated with a laser beam from exposure unit 10, so that a static latent image for every color is formed on the photoreceptor drum 21 for each color.

Then, toner is supplied from developing device 23 to the outer peripheral surface of photoreceptor drum 21 so that the static latent image formed on the outer peripheral surface of photoreceptor drum 21 is visualized with toner (to be a toner image).

The toner images formed on photoreceptor drums 21 are transferred to transfer belt 31.

Transfer of the toner image from photoreceptor drum 21 to transfer belt 31 is done by intermediate transfer roller 35 arranged in contact with the interior side of transfer belt 31.

As intermediate transfer roller 35 is applied with a high voltage of a polarity (+) opposite to that of the polarity (−) of the electrostatic charge on the toner, transfer belt 31 has a high potential uniformly applied by the intermediate transfer roller 35, presenting the opposite polarity (+). The toner image bearing negative (−) charge, on photoreceptor drum 21 is transferred to transfer belt 31 as the photoreceptor drum 21 turns and comes into contact with transfer belt 31.

The toner images of colors formed on respective photoreceptor drums 21 are transferred to transfer belt 31 as photoreceptor drums 21 turn and come into contact with the moving belt, and overlaid one over another, thus a color toner image is formed on transfer belt 31.

In this way, the toner images developed from static latent images on photoreceptor drums 21 for every color, are laminated on transfer belt 31 so that the image for printing is reproduced as a multi-color toner image on transfer belt 31.

Then, as transfer belt 31 moves and reaches the position where the recording sheet and the transfer belt 31 meet, the multi-color toner image on transfer belt 31 is transferred from transfer belt 31 to the recording sheet by the function of transfer roller 36.

Since the toner adhering to transfer belt 31 as the belt comes in contact with photoreceptor drums 21, or the toner which has not been transferred to the recording sheet by transfer roller 36 and remains on transfer belt 31, would cause contamination of color toners at the next operation, it is removed and collected by transfer belt cleaning unit 37.

Next, the operation of feeding recording sheets by paper feed portion 109 will be described.

When recording paper placed on manual feed tray 41 is used, the paper is taken in by pickup roller 41a from manual feed tray 41, sheet by sheet, at controlled timings in accordance with the instructions from the control panel (not shown), and fed into the machine.

The recording sheet thus taken into the machine is conveyed along recording paper feed path S1 by conveying rollers 41b, 41c and 41d to image forming portion 108.

When recording paper accommodated in paper feed cassette 42 is used, the paper is separated and fed from paper feed cassette 42, sheet by sheet, by pickup roller 42a, and conveyed by conveying roller 42b along recording paper feed path S2 to image forming portion 108.

The recording sheet conveyed from manual feed tray 41 or paper feed cassette 42 is delivered to the transfer roller 36 side, by registration roller 26, at such a timing as to bring the front end of the recording sheet in register with the leading end of the toner image on transfer belt 31, so that the toner image on transfer belt 31 is transferred to the recording sheet.

The recording sheet with a toner image formed thereon is further conveyed approximately vertically and reaches fixing unit 27, where the toner image is thermally fixed to the recording sheet by heat roller 27a and pressing roller 27b.

The recording sheet having passed through fixing unit 27, is discharged by discharge roller 28 when one-sided printing is selected, and placed face down on paper output tray 43.

In contrast, when double-sided printing is selected, the recording sheet is stopped and nipped by paper discharge roller 28, then the paper discharge roller 28 is rotated in reverse so that the recording sheet is guided to duplex printing paper path S3 and conveyed again to registration roller 26 by conveying rollers 29a and 29b.

By this movement, the printing face of the recording sheet is inverted and the direction of conveyance is reversed.

Illustratively, the leading edge of the sheet at the first printing is directed to the trailing end when the underside is to be printed, or the trailing edge of the sheet at the first printing is directed to the leading end when the underside is to be printed.

After the toner image is transferred and thermally fixed to the underside of the recording sheet, the sheet is discharged to paper output tray 43 by paper discharge roller 28.

Thus, the transfer operation to the recording sheet is done.

Next, ozone exhaustion by the ozone exhaust system of image forming apparatus 1 according to the present embodiment mode will be described taking one embodiment with reference to the drawings.

In this embodiment, ozone exhaust system 100 of image forming apparatus 1 according to the present embodiment mode is constructed such that, as shown in FIG. 4, the joints of process printing unit's side exhaust ducts 110a to 110c with main exhaust duct 101 are formed straight while the joint of process printing unit's side exhaust duct 110d with main exhaust duct 101 is formed to be slanted, closer to the direction of air current R3.

In the thus configured ozone exhaust system 100, ozone concentration is measured inside charger case 224 of fourth-color process printing unit 20d and its process printing unit's side exhaust duct 110d to check the ozone exhaust conditions.

Figure 6:
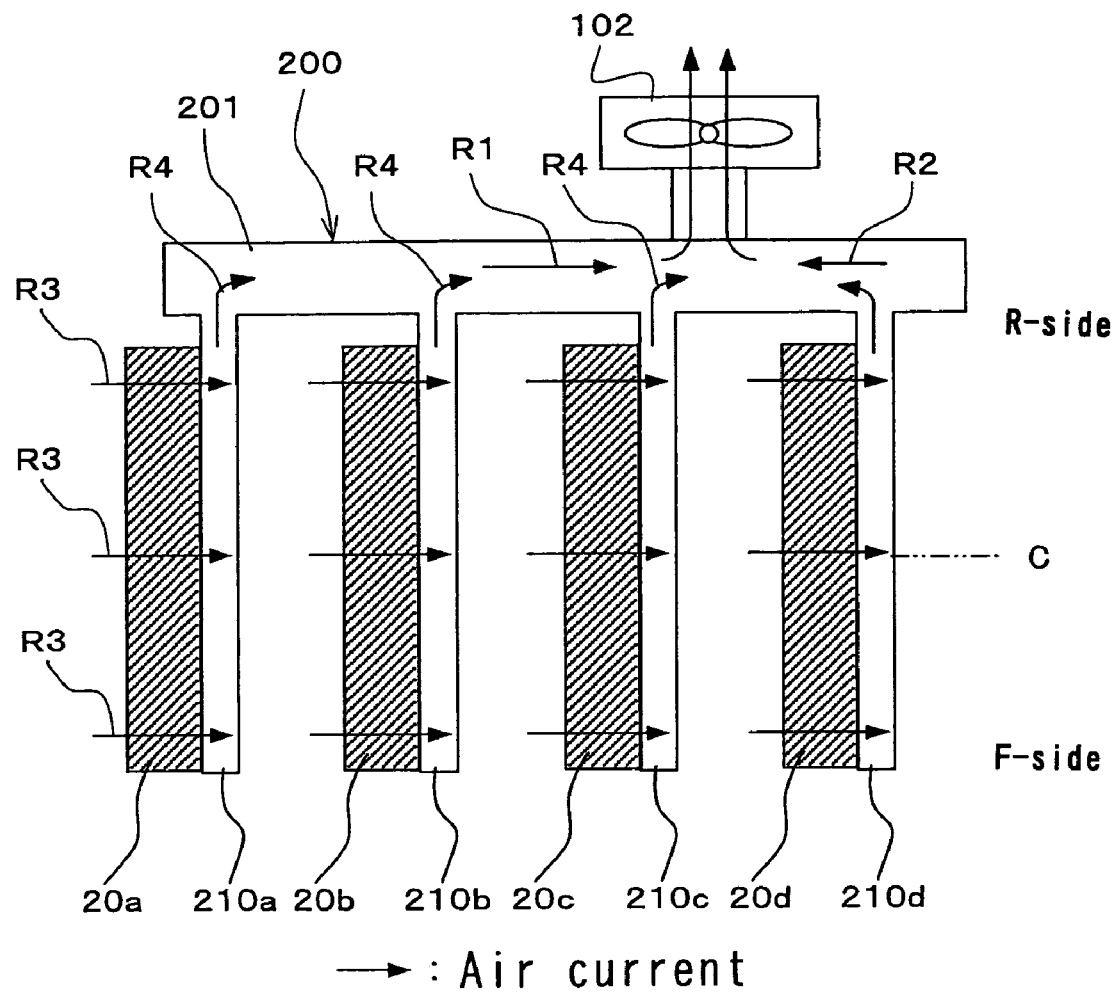
FIG. 6 is an illustrative diagram showing the overall configuration of an ozone exhaust system of a comparative example to be compared to the present embodiment.

Further, as a comparative example of this embodiment, an ozone exhaust system 200 as shown in FIG. 6 is constructed so that all the joints of process printing unit's side exhaust ducts, designated at 210a to 210d, with a main duct 201 are formed straight. With this comparative configuration, ozone concentration is measured inside charger case 224 of fourth-color process printing unit 20d and its process printing unit's side exhaust duct 210d, similarly to the above embodiment, and the embodiment and comparative example are examined with regard to the ozone exhaust conditions.

In each configuration, ozone concentration was measured at a point before the filter, at predetermined points on the F-side and R-side and at the approximate midpoint C between the F-side and the R-side, inside charger case 224 and inside process printing unit's side exhaust duct 110d or 210d, every unit of time past while image forming apparatus 1 was operated with a grid voltage of −600V and a discharge needle current of −600 µA.

Figure 7:
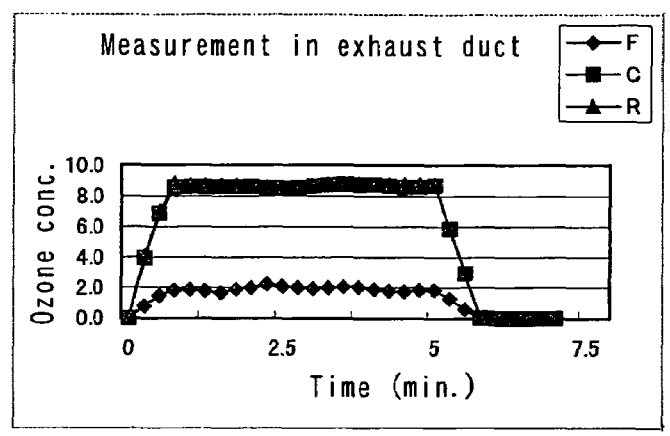
FIG. 7A is a graph showing time-dependent ozone concentration variations at different points inside the fourth-color process printing unit's side exhaust duct in the present embodiment.
FIG. 7B is a graph showing time-dependent ozone concentration variations at different points inside the charger case of the fourth-color process printing unit in the present embodiment.
FIG. 7C is a graph showing time-dependent ozone concentration variation at a point located before an ozone filter in the present embodiment.
Figure 7:
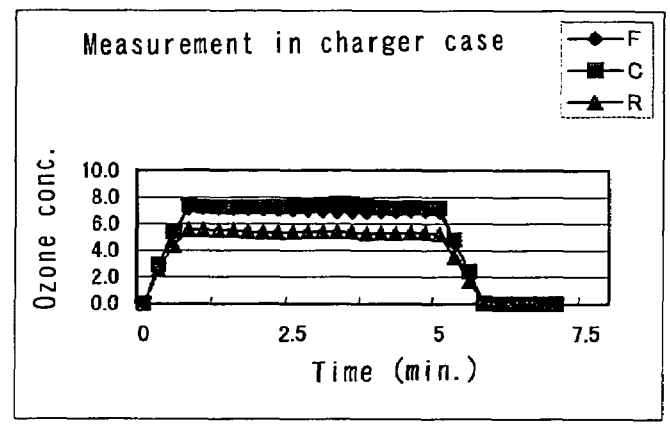
Figure 7:
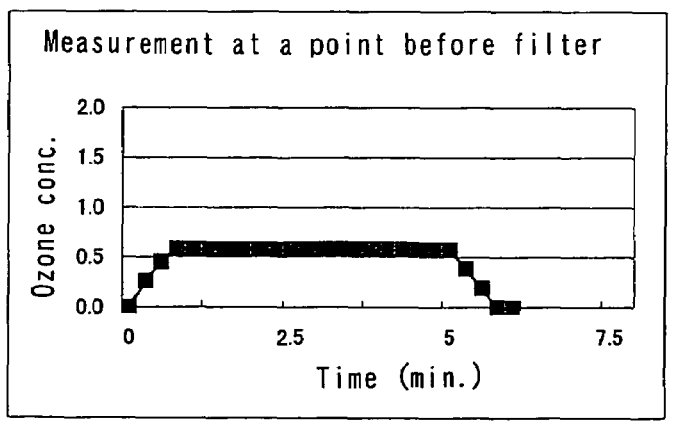

FIGS. 7A to 7C are graphs showing the measurement results of ozone concentration in the present embodiment: FIG. 7A is a graph showing time-dependent ozone concentrations at the points inside the fourth-color process printing unit's side exhaust duct in this embodiment; FIG. 7B is a graph showing time-dependent ozone concentrations at the points inside the charger case of the fourth-color process printing unit in this embodiment; and FIG. 7C is a graph showing time-dependent ozone concentrations at a point before the ozone filter in this embodiment.

Figure 8:
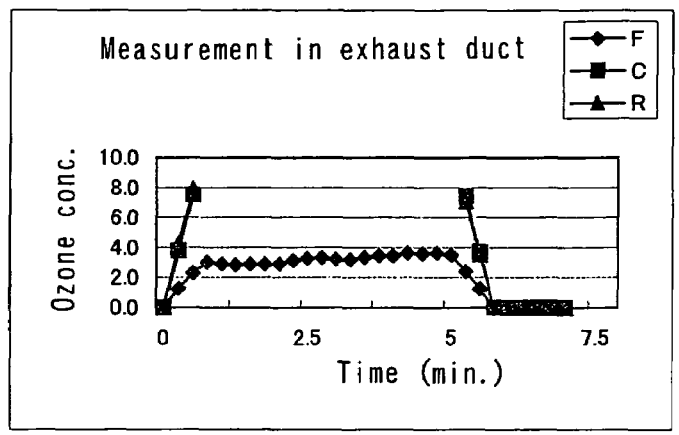
FIG. 8A is a graph showing time-dependent ozone concentration variations at different points inside the fourth-color process printing unit's side exhaust duct in a comparative example of the present embodiment.
FIG. 8B is a graph showing time-dependent ozone concentration variations at different points inside the charger case of the fourth-color process printing unit in a comparative example of the present embodiment.
FIG. 8C is a graph showing time-dependent ozone concentration variation at a point located before an ozone filter in a comparative example of the present embodiment.
Figure 8:
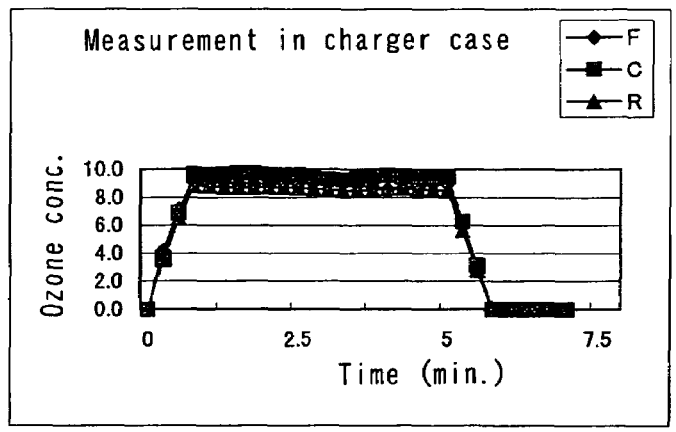
Figure 8:
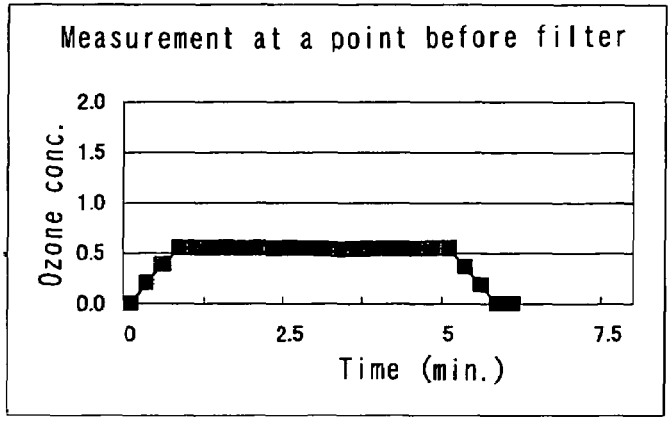

FIGS. 8A to 8C are graphs showing the measurement results of ozone concentration in the comparative example of the present embodiment: FIG. 8A is a graph showing time-dependent ozone concentrations at the points inside the fourth-color process printing unit's side exhaust duct in the comparative example; FIG. 8B is a graph showing time-dependent ozone concentrations at the points inside the charger case of the fourth-color process printing unit in the comparative example; and FIG. 8C is a graph showing time-dependent ozone concentrations before the ozone filter in the comparative example.

The ozone concentration inside the process printing unit's side exhaust duct 110d in this embodiment was about 2 ppm at the F-side and about 9 ppm at the midpoint C and at the R-side, as seen in FIG. 7A. That is, the concentration is higher as it goes toward the upstream side with respect to the flow of air.

The ozone concentrations inside charger case 224 were about 7 ppm, approximately uniform at the F-side, at the midpoint C and at the R-side, as seen in FIG. 7B.

Also, the ozone concentrations before the ozone filter were about 0.6 ppm or lower, as seen in FIG. 7C.

On the other hand, the ozone concentrations inside the process printing unit's side exhaust duct 210d in the comparative example could not be measured at the F-side and at the midpoint C, and was about 3 to 4 ppm at the R-side, as seen in FIG. 8A.

The ozone concentrations inside charger case 224 in the comparative example were about 9 ppm at the F-side, at the midpoint C and at the R-side, as seen in FIG. 8B, being higher than the result of the embodiment.

The ozone concentrations before the ozone filter were about 0.5 ppm, as seen in FIG. 8C.

As confirmed from the above measurement result, formation of joint 110d1 of process printing unit's side exhaust duct 110d coupled with main exhaust duct 101 to be slanted closer to the direction of air current R3 that flows into process printing unit 20d, as shown in FIG. 4, makes the air current R5 flowing into main exhaust duct 101, be directed in a direction close to the direction in which air current R3 flows, hence secures smooth flow of air through process printing unit's side exhaust duct 110d, whereby efficient air ventilation can be achieved inside the process printing unit 20.

Accordingly, it is possible to uniformly reduce the ozone concentration by exhausting ozone from charger case 224 in an even manner.

Here, since the ozone concentration at the point before the ozone filter does not significantly change when joint 110d1 of process printing unit's side exhaust duct 110d is replaced with the other configuration, it is understood that the layout change does not markedly affect the suctioning function on the suctioning side.

As described heretofore, according to the present embodiment mode, since in ozone exhaust system 100 of an image forming apparatus, process printing unit's side exhaust ducts 110a to 110d for exhausting ozone from the process printing units 20 are joined to main exhaust duct 101 in such a way that air current R3 flowing into charger cases 224 and air currents R4 and R5 flowing from process printing unit's side exhaust ducts 110a to 110d into main exhaust duct 101 are made to be almost equi-directional, it is possible to establish smooth flow of air through the process printing unit's side exhaust ducts 110a to 110d. As a result, it is possible to reduce the residual ozone concentrations inside process printing units 20a to 20d and equalize the ozone concentrations therein.

Further, according to the present embodiment mode, process printing unit's side exhaust ducts 110a to 110d provided for process printing units 20a to 20d are connected to the single main exhaust duct 101 so that ventilation of all the units will be done simultaneously by the single exhaust fan 102. Accordingly, it is possible to provide a simple and space-saving exhaust duct configuration with a reduced number of parts.

Moreover, according to the present embodiment mode, since exhaust fan 102 for ozone exhaustion is disposed between the third and fourth-color process printing unit's side exhaust ducts 110c and 110d, the exhaust fan 102 can fit within the minimum outside dimension in the sub-scan direction, thus making it possible to provide a compact configuration without enlargement of the outside dimensions of the apparatus.

Further more, according to the present embodiment mode, since the joint 110d1 between process printing unit's side exhaust duct 110d and main exhaust duct 101 is formed in essentially the same direction (equi-directionally) as air current R3 that flows into process printing unit 20d, it is possible to create smooth flow of air from process printing unit's side exhaust duct 110d toward main exhaust duct 101 even through the joint is angled in a direction against air current R2 flowing inside main exhaust duct 101.

Next, the second embodiment mode of an ozone exhaust system in an image forming apparatus according to the present invention will be described with reference to the drawings.

Here, the configuration of the image forming apparatus according to the this embodiment mode has the same configuration as that of the image forming apparatus 1 according to the previous embodiment mode. Hence, the description of the apparatus configuration, operation and function is omitted by reference to the previous description, except the configuration of the ozone exhaust system described below.

Figure 9:
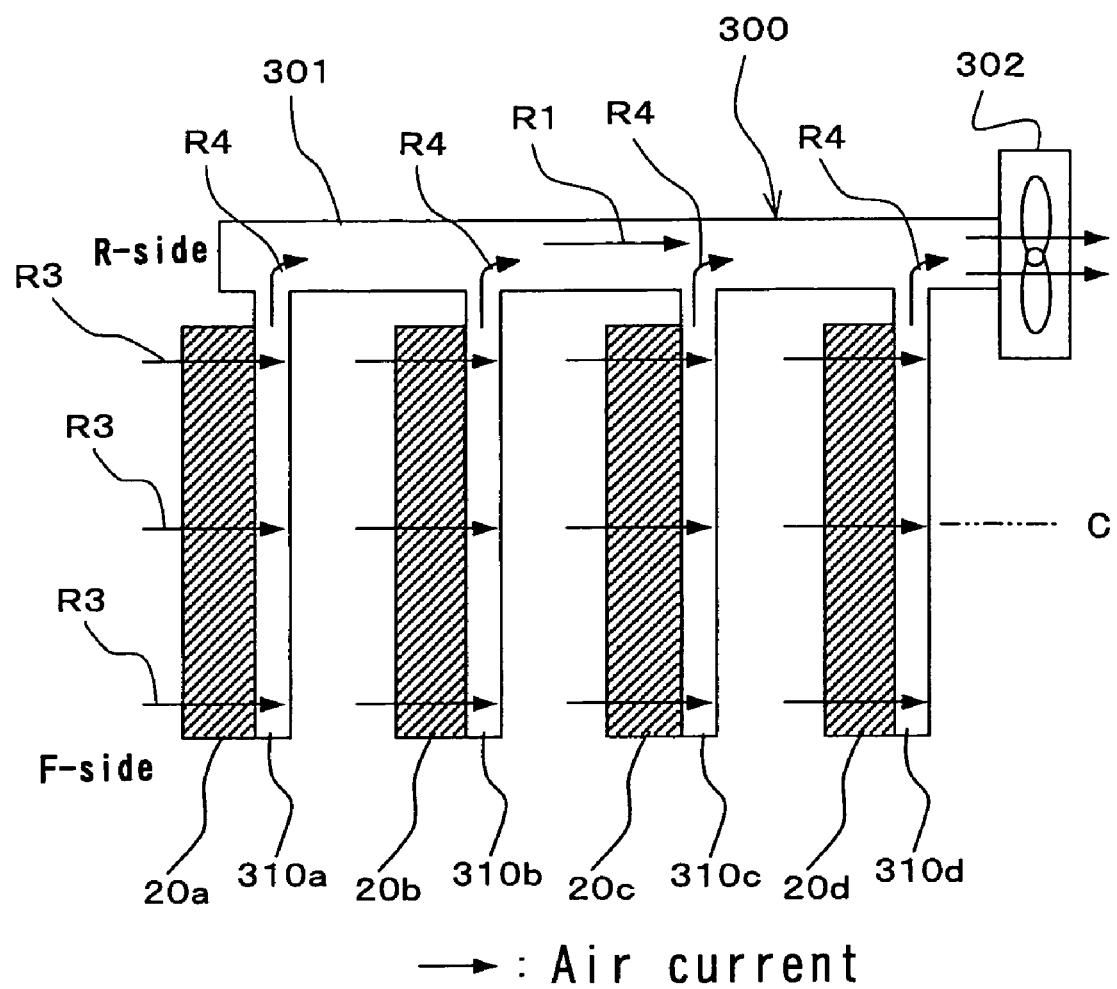
FIG. 9 is an illustrative diagram showing the overall configuration of an ozone exhaust system of an image forming apparatus according to the second embodiment mode of the present invention.

FIG. 9 is an illustrative diagram showing the overall configuration of an ozone exhaust system in the image forming apparatus according to the present embodiment mode.

As shown in FIG. 9, an ozone exhaust system 300 according to the present embodiment mode is constructed such that all the process printing unit's side exhaust ducts 310a, 310b, 310c and 310d provided for process printing units 20a, 20b, 20c and 20d are connected to a single main exhaust duct 301 so as to ventilate all the units simultaneously by a single exhaust fan 302.

Main exhaust duct 301 constitutes the main exhaust path of ozone exhaust system 300 and is disposed on one side of process printing units 20a to 20d that are arranged parallel to each other in the image forming apparatus and is extended along the direction of the arrangement of process printing units 20a to 20d.

Exhaust fan 302 is disposed on main exhaust duct 301, outside the process printing unit's side exhaust duct 310d provided for the fourth-color process printing unit 20d of the parallel arrangement of, four process printing units 20.

As a result, an air current R1 that flows from the first color side through the fourth color side of process printing units 20 to the exhaust fan 302 is created inside main exhaust duct 301.

Process printing unit's side exhaust ducts 310a to 310d in the present embodiment mode, all have the same configuration, and description herein is omitted by reference to the previous description of the configuration of process printing unit's side exhaust ducts 110a to 110d with FIG. 3.

Since process printing unit's side exhaust ducts 310a to 310d are closed on their F-side and connected at their R-side to main exhaust duct 301, air inside process printing unit's side exhaust ducts 310a to 310d is exhausted from the F-side to the R-side.

Concerning the flows of air into process printing unit's side exhaust ducts 310a to 310d, air flowing through grid electrode 221 and suctioning ports 225 provided for each charger case 224 and passing through charger case 224, enters the duct, in the same direction as that in which the transfer belt moves, as shown in FIGS. 2 and 9. That is, air current R3 flows in the same direction as that of the air current R1 which goes from the first color process printing unit through fourth-color process printing unit to exhaust fan 302 inside main exhaust duct 301.

In the thus configured ozone exhaust system 300, ozone concentration is measured inside charger cases 224 of process printing units 20a to 20d and inside process printing unit's side exhaust ducts 310a to 310d to check the ozone exhaust conditions.

Ozone concentration was measured at predetermined points on the F-side and R-side and at the approximate midpoint C between the F-side and the R-side, inside charger cases 224 and inside process printing unit's side exhaust ducts 310a to 310d, every unit of time past while image forming apparatus 1 was operated with a grid voltage of −600V and a discharge needle current of −600 μA.

Figure 10:
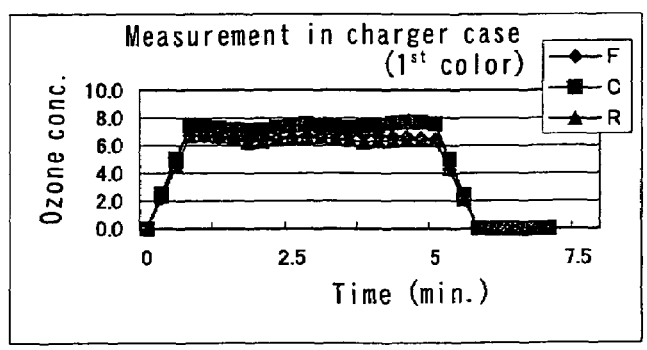
FIG. 10A is a graph showing time-dependent ozone concentration variations at different points inside the charger case of the first-color process printing unit in an image forming apparatus according to the second embodiment mode of the present invention.
FIG. 10B is a graph showing time-dependent ozone concentration variations at different points inside the charger case of the second-color process printing unit in an image forming apparatus according to the second embodiment mode of the present invention.
FIG. 10C is a graph showing time-dependent ozone concentration variations at different points inside the charger case of the third-color process printing unit in an image forming apparatus according to the second embodiment mode of the present invention.
FIG. 10D is a graph showing time-dependent ozone concentration variations at different points inside the charger case of the fourth-color process printing unit in an image forming apparatus according to the second embodiment mode of the present invention.
Figure 10:
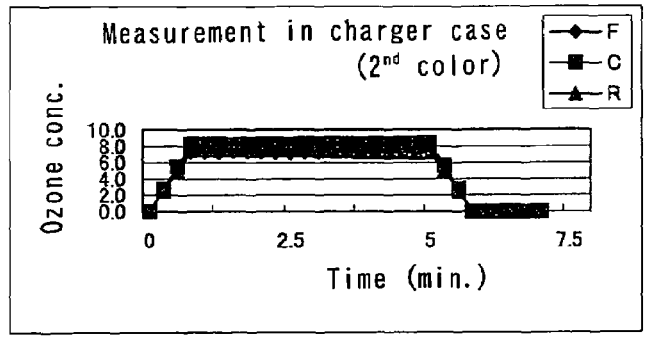
Figure 10:
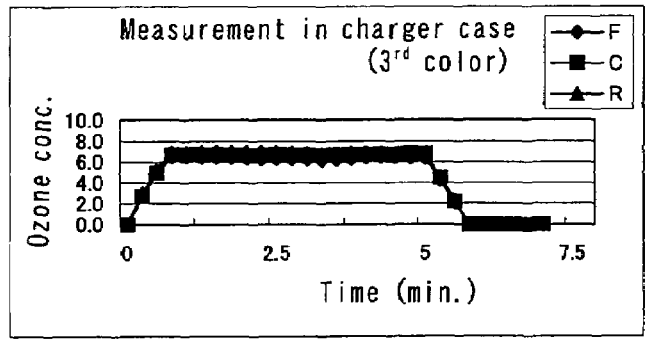
Figure 10:
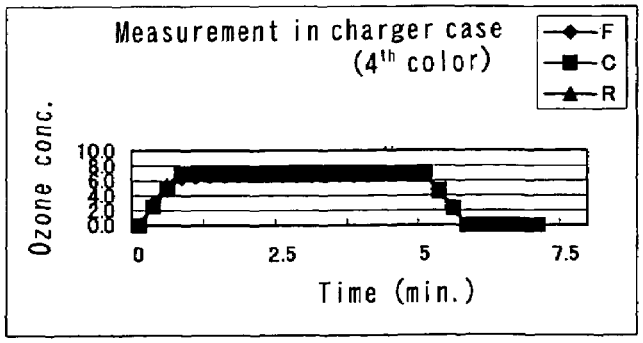

FIGS. 10A to 10D are graphs showing the measurement results of ozone concentration in the chargers in the present embodiment mode: FIG. 10A is a graph showing time-dependent ozone concentration variations at the predetermined points inside the charger case of the first-color process printing unit in the image forming apparatus according to the present embodiment mode; FIG. 10B is a graph showing time-dependent ozone concentration variations at the predetermined points inside the charger case of the second-color process printing unit in the image forming apparatus according to the present embodiment mode; FIG. 10C is a graph showing time-dependent ozone concentration variations at the predetermined points inside the charger case of the third-color process printing unit in the image forming apparatus according to the present embodiment mode; and FIG. 10D is a graph showing time-dependent ozone concentration variations at the predetermined points inside the charger case of the fourth-color process printing unit in the image forming apparatus according to the present embodiment mode.

Figure 11:
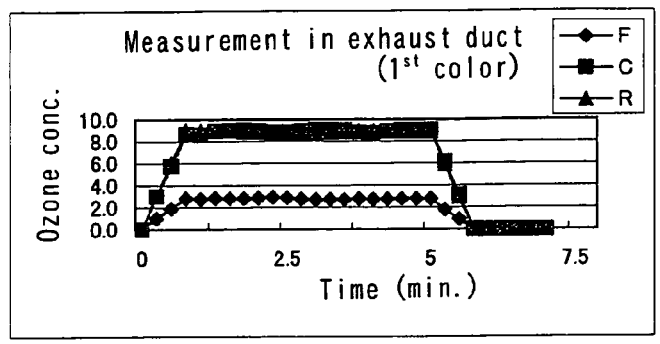
FIG. 11A is a graph showing time-dependent ozone concentration variations at different points inside the first-color process printing unit's side exhaust duct in an image forming apparatus according to the second embodiment mode of the present invention.
FIG. 11B is a graph showing time-dependent ozone concentration variations at different points inside the second-color process printing unit's side exhaust duct in an image forming apparatus according to the second embodiment mode of the present invention.
FIG. 11C is a graph showing time-dependent ozone concentration variations at different points inside the third-color process printing unit's side exhaust duct in an image forming apparatus according to the second embodiment mode of the present invention.
FIG. 11D is a graph showing time-dependent ozone concentration variations at different points inside the fourth-color process printing unit's side exhaust duct in an image forming apparatus according to the second embodiment mode of the present invention.
Figure 11:
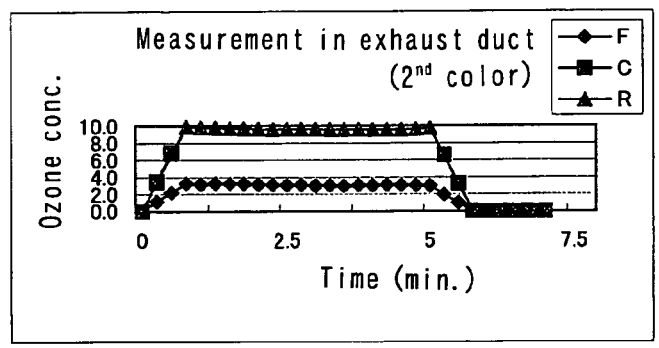
Figure 11:
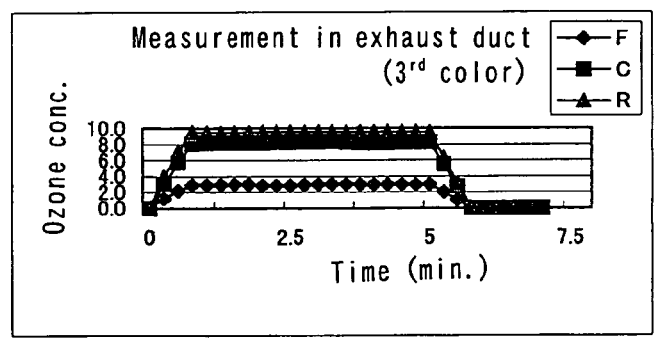
Figure 11:
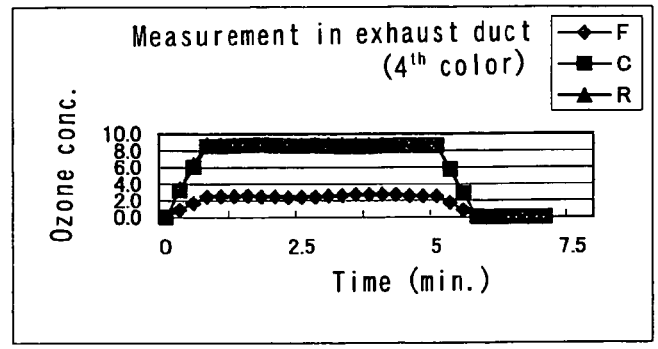

FIGS. 11A to 11D are graphs showing the measurement results of ozone concentration in the process printing unit's side exhaust ducts in the present embodiment mode: FIG. 11A is a graph showing time-dependent ozone concentration variations at the predetermined points inside the first-color process printing unit's side exhaust duct in the image forming apparatus according to the present embodiment mode; FIG. 11B is a graph showing time-dependent ozone concentration variations at the predetermined points inside the second-color process printing unit's side exhaust duct in the image forming apparatus according to the present embodiment mode; FIG. 11C is a graph showing time-dependent ozone concentration variations at the predetermined points inside the third-color process printing unit's side exhaust duct in the image forming apparatus according to the present embodiment mode; and FIG. 11D is a graph showing time-dependent ozone concentration variations at the predetermined points inside the fourth-color process printing unit's side exhaust duct in the image forming apparatus according to the present embodiment mode.

The ozone concentrations inside the charger cases 224 according to the present embodiment mode, fell within the range of about 6 to 8 ppm, at the F-side, the midpoint C and the R-side, for all the charger cases of the first to fourth colors, as seen in FIGS. 10A to 10D. That is, this shows that ozone can be equally exhausted from all the four process printing units 20a to 20d for the first to fourth colors and therearound.

On the other hand, the ozone concentrations inside process printing unit's side exhaust ducts 310a to 310d were about 8 to 10 ppm at the R-side and at the midpoint C, and about 2.5 to 3 ppm at the F-side for all the four process printing unit's side exhaust ducts 310a to 310d for the first to fourth colors, as seen in FIGS. 11A to 11D.

From the above result, according to the present embodiment mode, process printing unit's side exhaust ducts 310a to 310d are connected to main exhaust duct 301 in a manner that allows all the air current to flow under equivalent condition. By this arrangement, it is possible to generate air current R4 that flows in the same direction in main exhaust duct 301 and hence exhaust ozone equally from all the ducts.

As described heretofore, according to the present embodiment mode, since in ozone exhaust system 300 of an image forming apparatus, process printing unit's side exhaust ducts 310a to 310d for exhausting ozone from the process printing units 20 are joined to main exhaust duct 301 in such a way that air current R3 flowing into charger cases 224 and air current R4 flowing from process printing unit's side exhaust ducts 310a to 310d into main exhaust duct 301 are made to be almost equi-directional, it is possible to establish smooth flow of air through the process printing unit's side exhaust ducts 310a to 310d. As a result, it is possible to reduce the residual ozone concentrations inside process printing units 20a to 20d and equalize the ozone concentrations therein.

Further, according to the present embodiment mode, process printing unit's side exhaust ducts 310a to 310d provided for process printing units 20a to 20d are connected to the single main exhaust duct 301 so that ventilation of all the units will be done simultaneously by the single exhaust fan 302. Accordingly, it is possible to provide a simple and space-saving exhaust duct configuration with a reduced number of parts.

Furthermore, according to the present embodiment mode, since exhaust fan 302 is disposed outside the fourth-color process printing unit's side exhaust duct 310d, air can be drawn from all the process printing unit's side exhaust ducts 310a to 310d, in the same direction and also air current R4 that flows in essentially the same direction (equi-directionally) as air current R3 that flows into process printing units 20a to 20d, are created. As a result, it is possible to create smooth flow of air in process printing unit's side exhaust ducts 310a to 310d, and hence equalize the ozone concentrations therein.

Finally, the ozone exhaust system of an image forming apparatus of the present invention should not be limited to the above embodiment modes and the specific embodiments, and it is obvious that various changes in the structure may be made without departing from the spirit and scope of the present invention.

For example, in the present embodiment mode, charger cases 224 and process printing unit's side exhaust ducts 110a to 110d are provided separately, but the charger case and exhaust duct may be integrally formed so that the integrated structure will have both the charger case function and the exhaust duct function.

What is claimed is:

1. An ozone exhaust system for use in an image forming apparatus including a plurality of process printing units, each of said process printing units creating a separated color image corresponding to a color of color-separated image information, comprising:

shielding members each enclosing an electric field generating element of one of the process printing units and each extending from one side end to another side end of the electric field generating element; and exhaust passages each connected to one of the shielding members and exhausting ozone generated in the shielding members, wherein the exhaust passages include a plurality of process printing unit side exhaust passages provided for the respective shielding members, and a main exhaust passage to which the process printing unit side exhaust passages are connected, wherein each of the printing unit's side exhaust passages has a respective joint with the main exhaust passage, an exhaust fan at an exhaust outlet of the main exhaust passage, wherein the exhaust outlet is aligned between two of the joints with the printing unit's side exhaust passages, and at least one of the two joints for the process printing unit's side exhaust passages directs air current into the main exhaust passage to flow in the same direction as the air current flowing through the shielding members connected to the process printing unit's side exhaust passages and another of the two joints directs the air current through a joint duct slanted at an acute angle with respect to a flow direction of air through the shielding member connected to the process printing unit's side exhaust passage having the joint duct.

2. The ozone exhaust system for use in an image forming apparatus according to claim 1, wherein:

the main exhaust passage is laid out on one side of the process printing units that are arranged parallel to each other, along the direction of arrangement of the process printing units;

the process printing unit's side exhaust passages are extended approximately perpendicularly to the main exhaust passage and arranged parallel to each other along the direction of the air current inside the main exhaust passage; and the exhaust fan is provided for the main exhaust passage, at a position on an interior side of the main exhaust passage relative to the process printing unit's side exhaust passages.

3. The ozone exhaust system for use in an image forming apparatus according to claim 2, wherein at least one of the joints of the process printing unit's side exhaust passages with the main exhaust passage is arranged in a direction slanting towards a downstream direction of the air current flowing into the shielding member, and the slanting forms an acute angle with respect to a direction perpendicular to the main exhaust passage.

4. The ozone exhaust system for use in an image forming apparatus according to claim 2, wherein the process printing unit's side exhaust passage is arranged so that the air current that flows into the shielding member and the air current that flows from the process printing unit's side exhaust passage into the main exhaust passage are directed in the same direction, and at least one of the joints between one of the process printing unit's side exhaust passage and the main exhaust passage forms an angle smaller than 90 degrees with respect to the direction of the air current flowing through the main exhaust passage.

5. The ozone exhaust system for use in an image forming apparatus according to claim 2, wherein at least one of the process printing unit's side exhaust passages has air current that flows into the shielding member in a direction opposite to the air current that flows from the process printing unit's side exhaust passage into the main exhaust passage, and the at least one of the process printing unit's side exhaust passages is joined to the main exhaust passage by a joint passage forming an angle equal to or smaller than 90 degrees with respect to the opposite direction of the air current flowing through the main exhaust passage.

6. The ozone exhaust system for use in an image forming apparatus according to claim 1, wherein at least one of the joints of the process printing unit's side exhaust passages with the main exhaust passage is arranged in a direction slanting towards a downstream direction with respect to the direction of the air current that flows into the shielding member, and the slanting forms an acute angle with respect to a direction perpendicular to the main exhaust passage.

7. An ozone exhaust system included in an image forming apparatus having a plurality of process color printing units having an electric field generating element and a corresponding shield, wherein air pass through the shield in a first flow direction perpendicular to the electric field generating element and the air includes ozone generated by the electric field generating element, the ozone exhaust system comprising:

a plurality of side exhaust passages each coupled to one of the shields, wherein each of the side exhaust passages is arranged transverse to the first flow direction of air passing through the shield and receives the air from the shield;

a main exhaust passage receiving the air from each of the side exhaust passages and directing the air to an exhaust fan, wherein the air passes through the main exhaust passage along a longitudinal axis of the main exhaust passage and the longitudinal axis is substantially parallel to the first flow direction of air passing through the shields;

for each of the side exhaust passages, a joint is between the side exhaust passage and the main exhaust passage, wherein the joint for at least one of the side exhaust passages is a joint duct having a longitudinal axis forming an acute angle with respect to the first flow direction.

8. The ozone exhaust system of claim 7 wherein the exhaust fan is aligned between the at least one of the side exhaust passages having the joint duct and another of the side exhaust passages.

* * * * *